United States Patent
Persson

(10) Patent No.: US 7,113,662 B2
(45) Date of Patent: Sep. 26, 2006

(54) OPTICAL FILTERING BY USING AN ADD-DROP NODE

(75) Inventor: Ulf Persson, Skogås (SE)

(73) Assignee: Lumentis AB, Hagersten (SE)

( * ) Notice: Subject to any disclaimer, the term of this patent is extended or adjusted under 35 U.S.C. 154(b) by 0 days.

(21) Appl. No.: 10/483,516

(22) PCT Filed: Jul. 5, 2002

(86) PCT No.: PCT/SE02/01352

§ 371 (c)(1),
(2), (4) Date: Jun. 24, 2004

(87) PCT Pub. No.: WO03/009510

PCT Pub. Date: Jan. 30, 2003

(65) Prior Publication Data

US 2004/0234194 A1    Nov. 25, 2004

(30) Foreign Application Priority Data

Jul. 16, 2001    (SE)    .................................... 0102541

(51) Int. Cl.
*G02B 6/26* (2006.01)
*G02B 6/42* (2006.01)
*H04J 14/02* (2006.01)

(52) U.S. Cl. ............................ 385/16; 385/17; 385/20; 385/24; 398/45; 398/48; 398/50; 398/79; 398/82; 398/83; 398/85

(58) Field of Classification Search ............ 385/15–17, 385/24; 398/43, 45, 68, 72, 79, 82–85; 370/222–224
See application file for complete search history.

(56) References Cited

U.S. PATENT DOCUMENTS

| | | | | |
|---|---|---|---|---|
| 5,303,078 A | * | 4/1994 | Brackett et al. ............... | 398/51 |
| 5,712,717 A | * | 1/1998 | Hamel et al. ................... | 398/85 |
| 5,915,051 A | * | 6/1999 | Damask et al. ................ | 385/16 |
| 6,173,093 B1 | * | 1/2001 | Jeal .............................. | 385/24 |
| 6,219,474 B1 | * | 4/2001 | Cai et al. ....................... | 385/24 |

FOREIGN PATENT DOCUMENTS

| | | |
|---|---|---|
| EP | 0905936 A2 | 3/1999 |
| EP | 0985942 A2 | 7/1999 |
| EP | 1109341 A2 | 6/2001 |

* cited by examiner

*Primary Examiner*—Frank G. Font
*Assistant Examiner*—Ryan Lepisto
(74) *Attorney, Agent, or Firm*—Ware, Fressola, Van Der Sluys & Adolphson LLP

(57) ABSTRACT

The present invention relates to a method using a node, a system comprising a node and a node for filtering signals in a wavelength division multiplexing (WDM) optical communications system, especially for re-configurably adding and dropping signals to and from an optical fibre path. The node comprising a drop filter, an add filter, a signal channel receiver, and a signal channel transmitter each being connected to a switch for signal channel relaying between said network, and signal channel dropping and adding from and to said network. The node provides low loss for relayed signals by allowing the drop filter to have a low crosstalk isolation, and provides high crosstalk isolation for dropped signal channels by connecting said receiver to the switch through an additional filter with high filtering characteristics for at least one predetermined signal channel of said signal.

9 Claims, 8 Drawing Sheets

Continue Mode    Add-Drop Mode

OPTICAL FILTERING BY USING AN ADD-DROP NODE

BACKGROUND OF THE INVENTION

1. Technical Field

The present invention pertains to a method, a system and a node for filtering signals in a wavelength division multiplexing (WDM) optical communications system, especially for re-configurably adding and dropping signals to and from an optical fiber path.

2. Description of Related Art

Wavelength division multiplexing (WDM) is a method for high bandwidth transmissions in optical fibre communication systems. In WDM, the optical transmission spectrum is divided into a number of separated wavelength bands, where each wavelength supports a single communication channel. Several channels can be transmitted simultaneously on the same optical fibre. WDM can be used for point-to-point communication where two nodes, one in each end of the fibre, are connected, or for multipoint-to-multipoint communication where several nodes share the transmission capacity on one fibre or one pair of fibres. In the case of multipoint-to-multipoint communication the fibre path usually forms a closed loop (a ring) in order to have two different routes in between a certain pair of nodes in the case of fibre or other equipment failure. But bus networks where end nodes are located in different places are also possible. An example of an add-drop node in such a ring or bus WDM network is provided in application EP 0905936 A2.

SUMMARY OF THE INVENTION

There is a high demand for crosstalk isolation for received signals in communication networks. Therefore drop filters with good crosstalk isolation are commonly used. These drop filters yield a loss to the dropped signal. If a signal on a specific channel passes several nodes set to a continue mode, so that the signal is relayed, i.e. dropped and added, several times, the losses limit the travel distance of the signal. This is disadvantageous, especially in unamplified systems.

To keep down the losses for relayed signals, the solution according to the present invention uses drop filters with low losses and less stringent demands for crosstalk isolation. The signals can then be relayed with low losses. In this way there is a smaller need for amplifiers in networks utilising the invention. To provide good crosstalk isolation for the received signals (in an add-drop mode), the solution according to the present invention has an additional filter between the switch and the receiver.

The present invention sets forth an add-drop node for wavelength division multiplexing an optical signal transmission on an optical fiber network between multiple add-drop nodes. The add-drop node comprises a drop filter, an add filter, a signal channel receiver, and a signal channel transmitter each being connected to a switch for signal channel relaying between said optical fiber network, and signal channel dropping and adding from and to said optical fiber network. The add-drop node accomplishes a low loss for relayed signals by allowing the drop filter having a low cross-talk isolation, and high crosstalk isolation by connecting the signal channel receiver to the switch through an additional filter with high filtering characteristics for at least one predetermined signal channel of said optical signal transmission.

In one embodiment of the add-drop node according to the present invention, the drop filter is a channel drop filter for dropping signals on a single channel.

In another embodiment of the add-drop node according to the present invention the drop filter is a band drop filter for dropping signals on two or more channels and the additional filter forms a part of a demultiplexer.

The present invention further sets forth a system comprising at least one add-drop node for wavelength division multiplexing an optical signal transmission on an optical fiber network between other add-drop nodes. The at least one node comprises a low loss drop filter, an add filter, a signal channel receiver, and a signal channel transmitter each being connected to a switch for signal channel relaying between said optical fiber network, and signal channel dropping and adding from and to said optical fiber network. The system accomplishes a low loss for relayed signals by allowing the drop filter having a low cross-talk isolation, and high crosstalk isolation by connecting the signal channel receiver to the switch through an additional filter with high filtering characteristics for at least one predetermined signal channel of said optical signal transmission.

In one embodiment of the system according to the present invention, the drop filter is a channel drop filter for dropping signals on a single channel.

In another embodiment of the system according to the present invention, the drop filter is a band drop filter for dropping signals on two or more channels and the additional filter forms a part of a demultiplexer.

The present invention further sets forth a method using an add-drop node for wavelength division multiplexing an optical signal transmission on an optical fiber network between multiple add-drop nodes. The node, used in the method, comprises a low loss drop filter, an add filter, a signal channel receiver, and a signal channel transmitter each being connected to a switch for signal channel relaying between said optical fiber network, and signal channel dropping and adding from and to said optical fiber network. The method comprises the steps of: accomplishing a low loss for relayed signal channels by allowing said drop filter having a low cross-talk isolation; providing high cross-talk isolation for dropped signal channels by connecting said signal channel receiver to the switch through an additional filter with high filtering characteristics for at least one predetermined signal channel of said optical signal transmission.

In one embodiment of the method according to the present invention, the drop filter is a channel drop filter for dropping signals on a single channel.

In another embodiment of the method according to the present invention, the drop filter is a band drop filter for dropping signals on two or more channels and the additional filter forms a part of a demultiplexer.

BRIEF DESCRIPTION OF THE DRAWINGS

Henceforth reference is had to the attached figures for a better understanding of the present invention and its examples and embodiments, wherein.

DETAILED DESCRIPTION OF INVENTION

Figure 1:
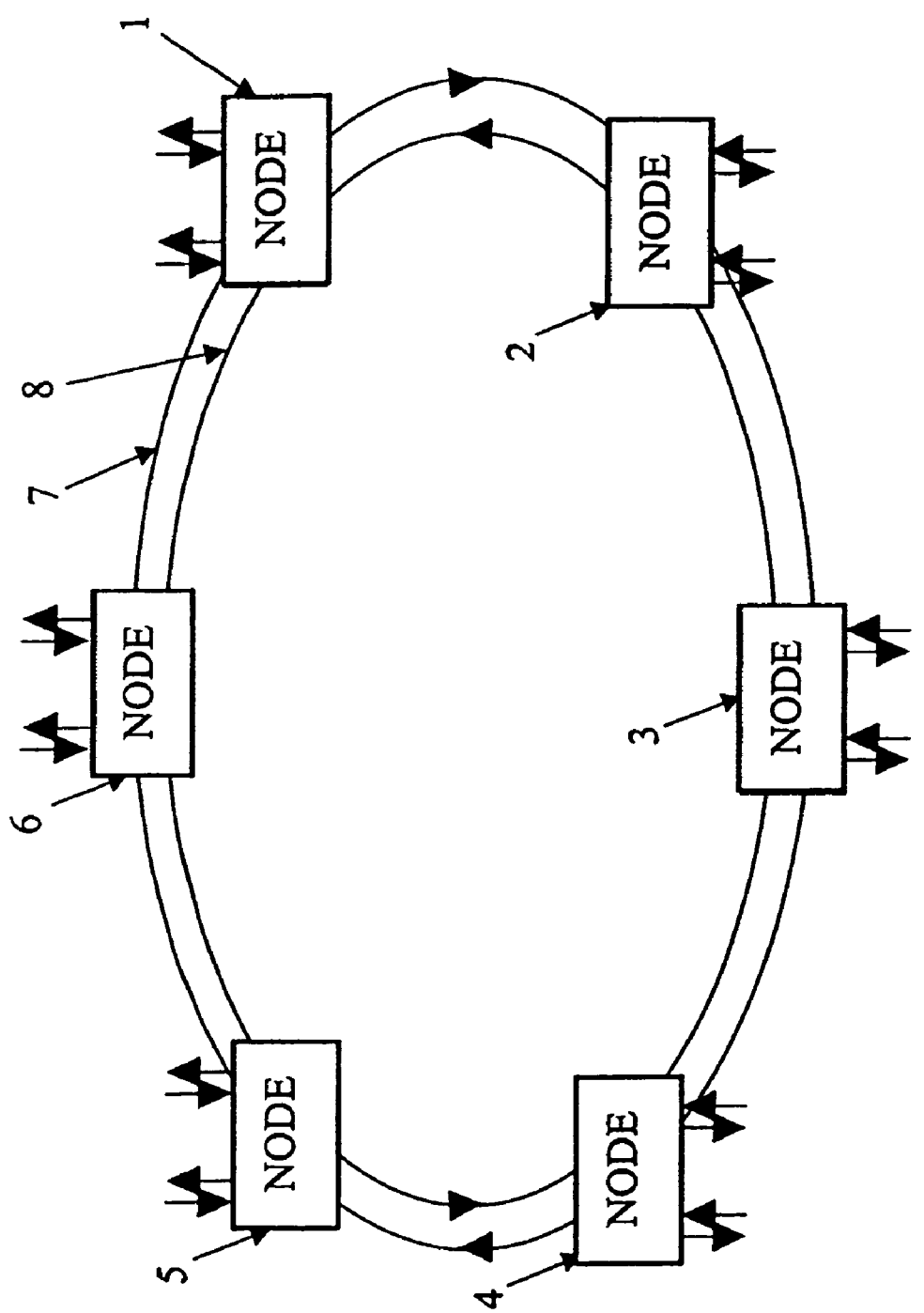
FIG. 1 illustrates a prior art WDM ring network.

A schematic drawing of an embodiment of a WDM ring network is given in FIG. 1. Optical fibres interconnect six nodes 1, 2, 3, 4, 5, 6. Two optical fibre paths form two rings 7, 8. The nodes add and drop signals to and from these rings. The communication traffic in the two rings travels in opposite directions. The traffic pattern is meshed, i.e. each node has direct access to every other node in the ring via a dedicated wavelength channel. This is typical for a traffic pattern high up in a network hierarchy (core rings). Further down in the network hierarchy closer to the end user (access rings), the traffic pattern is typically hubbed, i.e. one central node, the hub, has a direct connection (a dedicated wavelength channel) to every other small node (called satellite node). Satellite nodes have no direct wavelength channels in between each other.

Figure 2:
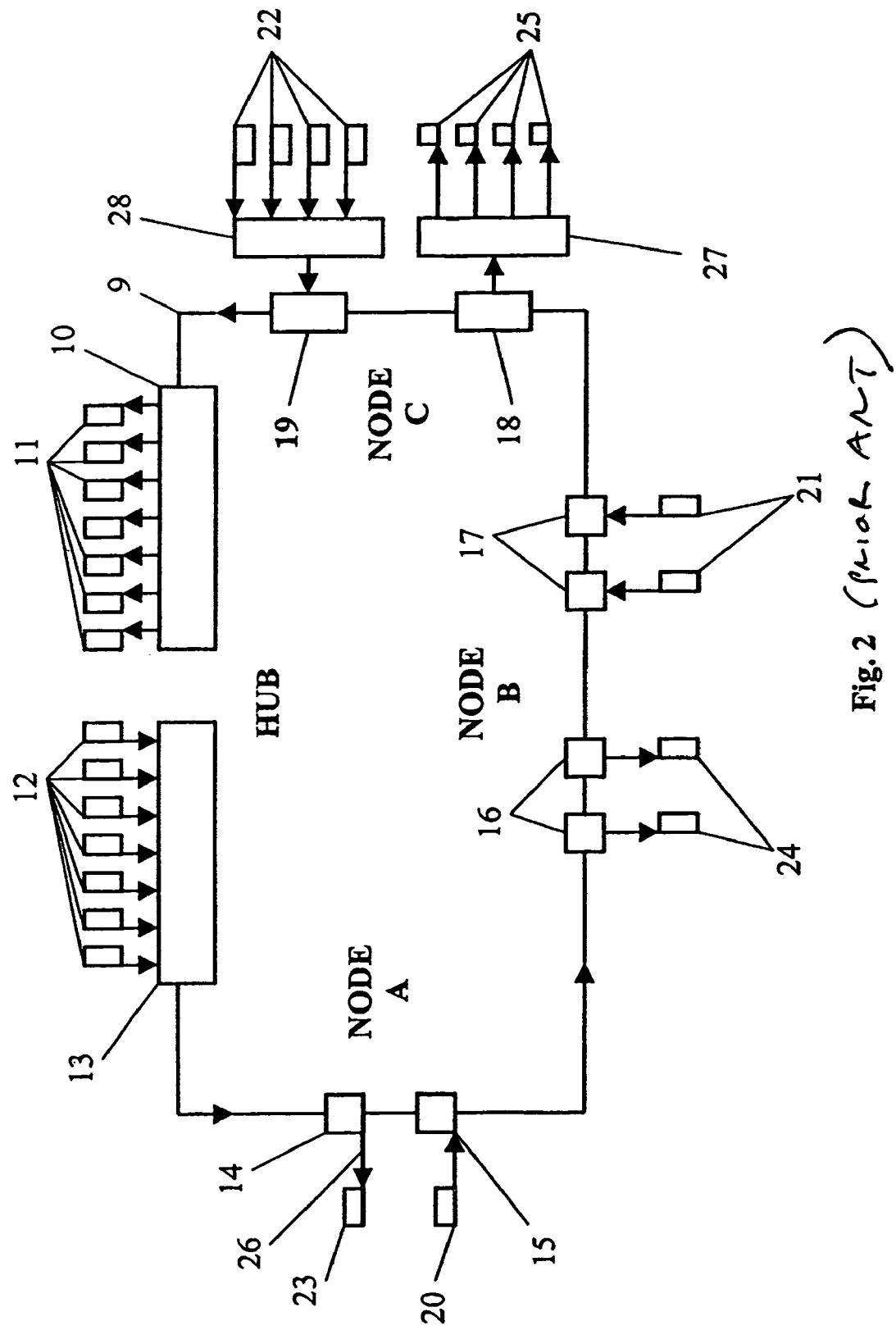
FIG. 2 illustrates a prior art hubbed WDM ring network.

An example of a hubbed WDM ring is shown in FIG. 2. Only one fibre ring 9 is shown for clarity. Normally, there are two fibre rings, for counter propagating traffic, for redundancy in case of a fibre break. Optical filters etc. are needed on each fibre. The hub in FIG. 2 includes a transmitting arrangement and a receiving arrangement. The receiving arrangement consists of a demultiplexer 10 followed by an array of WDM receivers 11 with photodetectors. The transmitting arrangement has seven optical transmitters and a multiplexer. Node A depicts a drop filter 14 and an add filter 15 for dropping and adding signals on one channel. In node B there are two drop filters 16 and two add filters 17 for dropping and adding signals on two channels. Node C illustrates a band drop filter 18 and a band add filter 19 for dropping and adding signals on four channels. Optical transmitters 20, 21, 22 and receivers 23, 24, 25 transmit and receive signals to and from the filters in each node. Each optical transmitter 12, 20, 21, 22 consists of a laser and a laser modulator. The transmitters transmit signals on one specific wavelength channel each. The signals in the hub are optically combined onto the fibre by the multiplexer 13. The signals on all channels are propagating along the ring from the hub to node A, where signals on channel 1 are directed, or dropped, into the short fibre 26 leading to the receiver 23 in that node. The drop filter 14 demultiplexes channel 1 into the drop fibre 26 with a low loss and blocks channel 1 from propagating further along the ring. All other wavelength channels pass through the drop filter along the ring with a low loss. The response from node A to the hub is sent by the laser in node A on wavelength channel 1. The signals on channel 1 are added onto the ring with a low loss. All signals on channels other than channel 1 are passing through the add filter 15 along the ring with a low loss.

In the same manner channels 2 and 3 are dropped by the drop filters 16 in node B, and the responses on the same wavelengths are added on the ring in the add filters 17.

In node C the same basic function is performed on channels 4 to 7, but in this case one band drop filter 18 is used to drop all four channels from the ring. These four channels are then demultiplexed by a demultiplexer 27 into individual wavelength channels before they can be received. In the same manner the transmitted signals on channel 4 to 7 are first multiplexed together before they are added onto the ring with the band add filter 19. An advantage, with using band drop and add filters in nodes with more than a few wavelength channels, is that losses for the channels passing transparently through that node (the express channels) is minimized. (This is described in application EP 0905936). A disadvantage with a WDM network such as this is that it is fixed, i.e. once a certain transmitter laser is brought into use the location of the receiver is decided.

Figure 3:
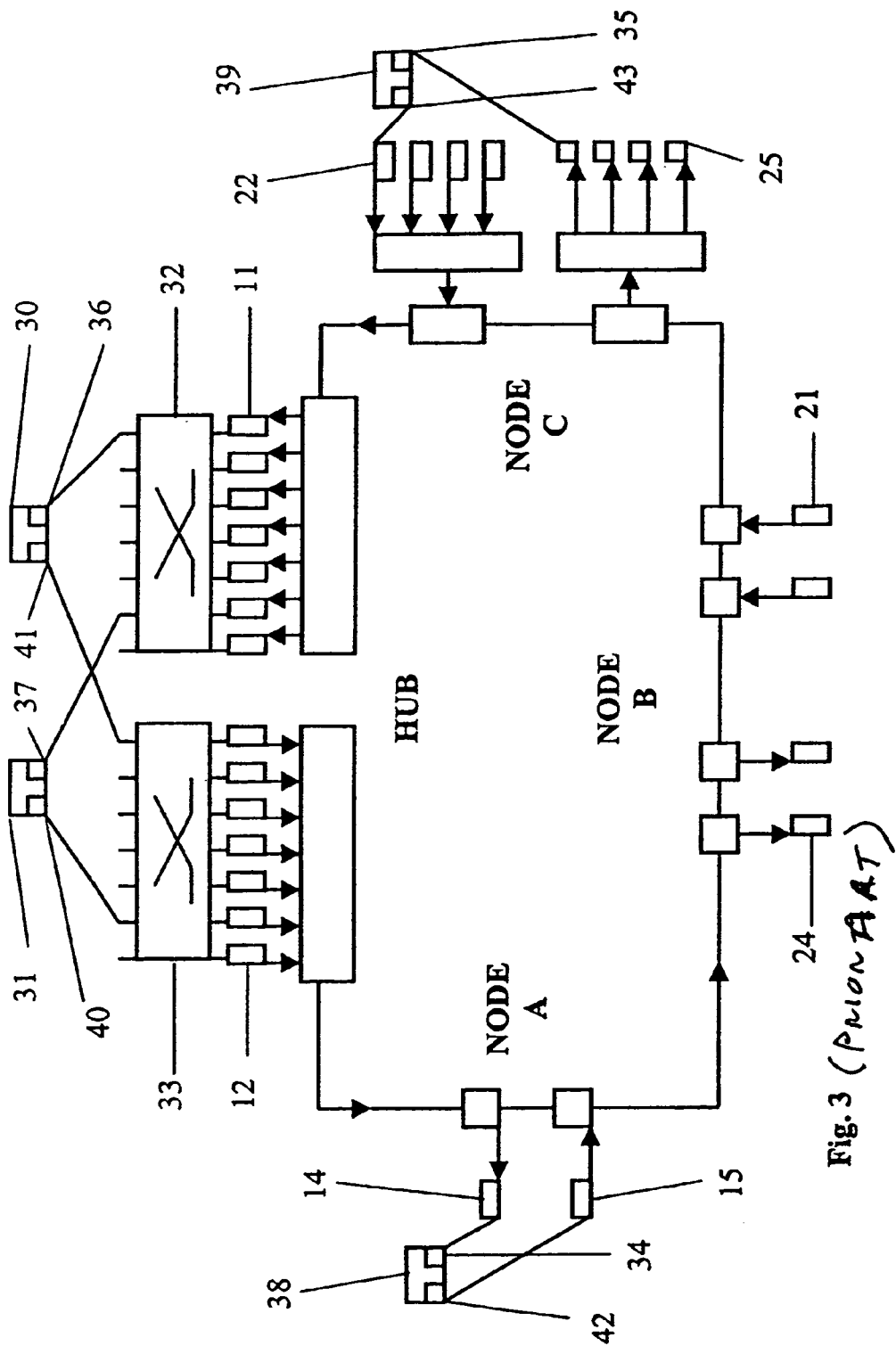
FIG. 3 illustrates a prior art network using both single channel and band filters for adding and dropping signals, and cross connections for performing routing.

To perform routing, cross-connections can be used before a signal reaches a laser in the hub. An example of a WDM network with flexible connections is given in FIG. 3. FIG. 3 shows client equipment 30, 31 connected to cross-connection switches 32, 33, which are connected to optical WDM transmitters 12 or WDM transmit end transponders (TETs), and to WDM receivers 11 or WDM receive end transponders (RETs) respectively. FIG. 3 also shows client equipment 38, 39 connected to nodes A and C. Each client equipment has transmitters 40, 41, 42, 43 and receivers 34, 35, 36, 37. There are N client equipments in the Hub that can communicate with N other client equipments at different locations in the satellite nodes. (In FIG. 3 N=7. In practice there is one client equipment for every WDM transmitter/receiver pair in the network, but only a few are shown for clarity.) A cross connect switch of size N×N (N input ports and N output ports) is placed in between the client transmitters and the WDM transmitters (or TETs), every client transmitter can be cross connected to any WDM transmitter and thus, via the fixed wavelength routing function in the WDM ring, reach any receiver 14, 24, 25, and the therewith connected client receiver 34, 35, in the network.

The fixed transmitters 15, 21, 22 in the satellite nodes are wavelength routed via the WDM ring network to a certain WDM receiver (or receive end transponder, RET) in the hub. If a cross connect switch of size N×N is placed in between the WDM receivers (or receive end transponders) and the client receivers 36, 37 in the hub, every WDM receiver 11 and thereby every satellite WDM transmitter 15, 21, 22 can reach every client receiver 36, 37 in the hub. In this way the cross-connections in the hub enables a flexible connection from any client equipment 30, 31 in the hub to any client equipment 38, 39 in the satellite nodes. The location of the client equipment (shown in FIG. 3 in the hub) does not necessarily have to be in the hub. They can be placed further away and via other (optical) networks have their signals transmitted to the hub. The cross connect switches can be either all optical or have an electrical switch core.

Figure 4:
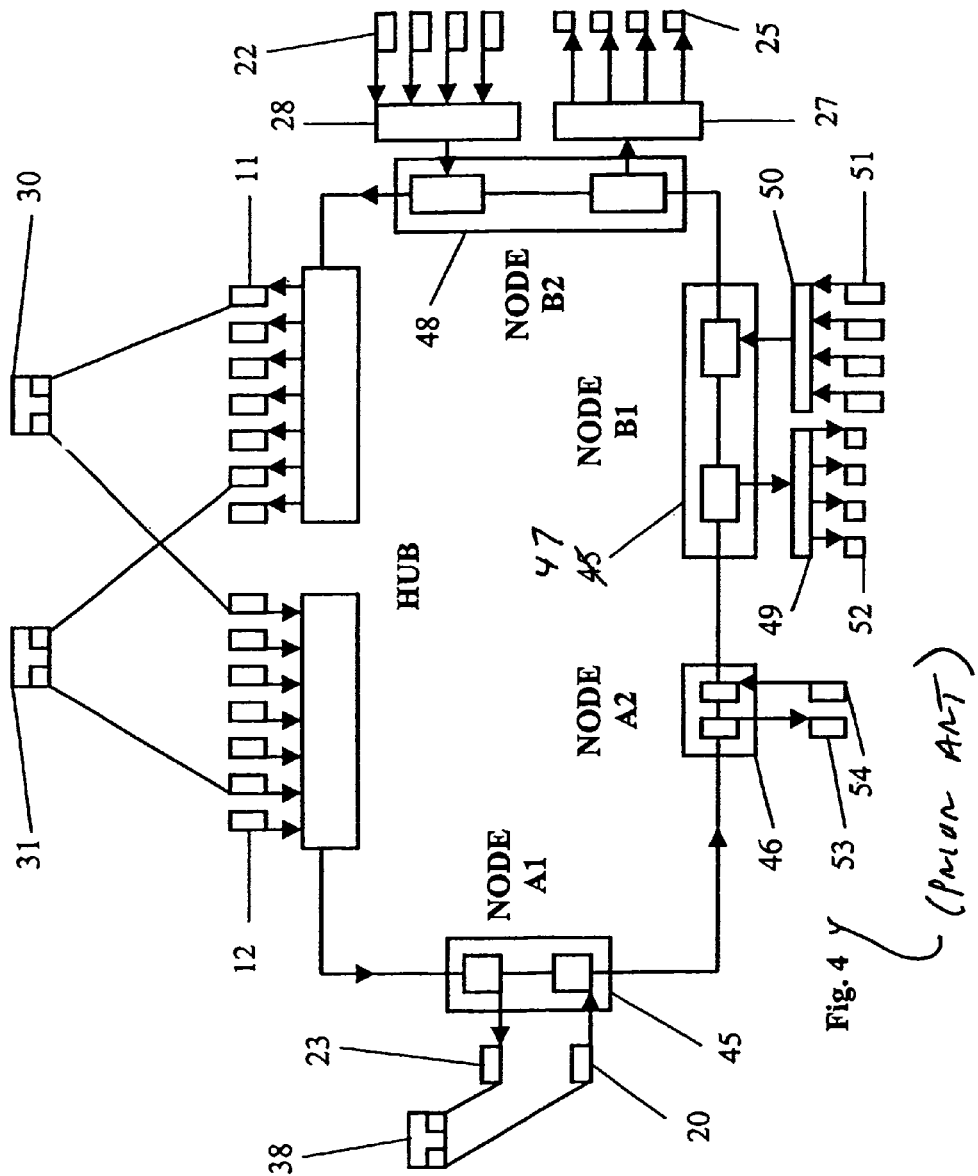
FIG. 4 illustrates a prior art network using re-configurable add and drop filters.

Another method to realize configurable networks is to use reconfigurable add and drop filters in the nodes instead of the fixed filters in the examples in FIGS. 2 and 3. This is illustrated in FIG. 4. In this example there are reconfigurable filters in node A1 and A2 that either drop and add signals on channel A, or let all signals pass through. Node A2 has a reconfigurable add and drop filter 46 connected to a WDM transmitter 54 and a WDM receiver 53. The filters in node B1 and B2 are reconfigurable band filters and can in the same way let all signals pass through, or drop and add signals on a plurality of channels, band B. All the client equipments 30, 31 (only two are shown) in the main node (the hub) have fixed connections to the WDM transmitters 12 and receivers 11. In the satellite nodes the add and drop filters 45, 46, 47, 48 are reconfigurable instead of fixed. Signals on channel A that are added in the hub can be dropped either in node A1 or node A2. If the filter in node A1 is set in a add-drop mode and the filter in node A2 is set in a continue mode the client equipment 38 in node A1 will receive signals on channel A from the hub and transmit to the hub on channel A. If the filter in node A1 is set in the continue mode and the filter in node A2 in add-drop mode, then node A2 will communicate with the hub. The filters in node B1 and B2 can be used in the same way so that either of the nodes can communicate with the hub. The only difference is that a band of two or more channels are used instead of a single channel. In nodes B1 and B2 multiplexers 28, 50 and demultiplexers 27, 49 connects the add and drop filters 47, 48 to WDM transmitters 22, 51 and WDM receivers 25, 52. There exist several ways to realize re-configurable drop filters. An example of such a "drop or not" filter is a filter manufactured by Corning Inc. (product series Pure Path WMS) and consists of a movable dielectric multiple interference filter where one part of the filter is a standard band pass filter and one part is a non-selective mirror. The networks illustrated in FIGS. 2-4 describe different types of prior art nodes. The present invention is in one embodiment a node that can be used in similar networks.

Figure 5:
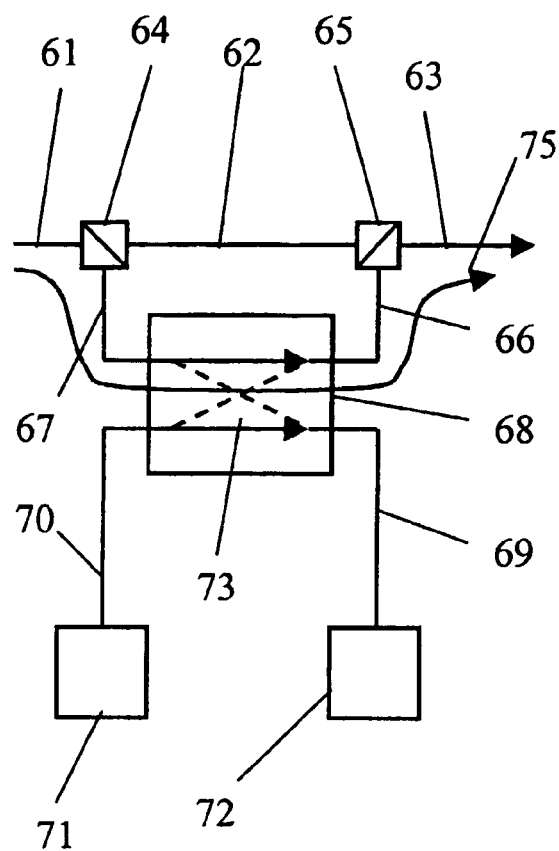
FIG. 5 illustrates an arrangement using a cross-bar switch and fixed filters to realize a re-configurable network.
Figure 5:
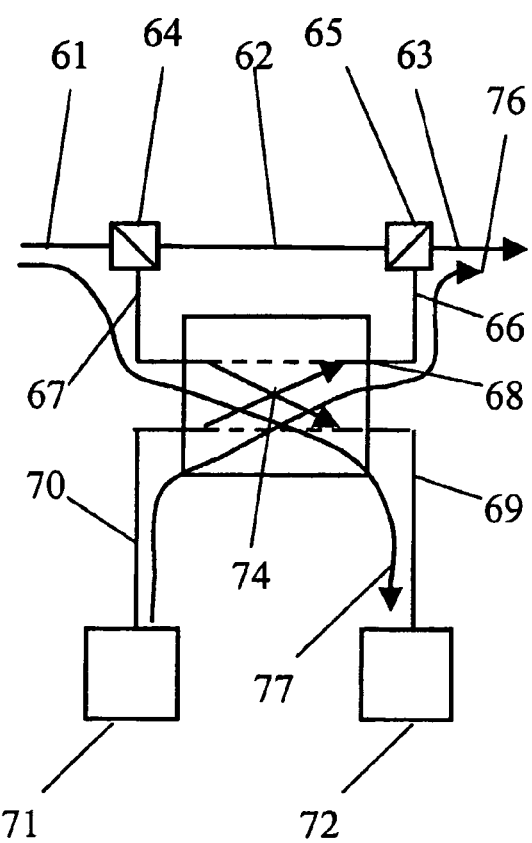
Figure 8:
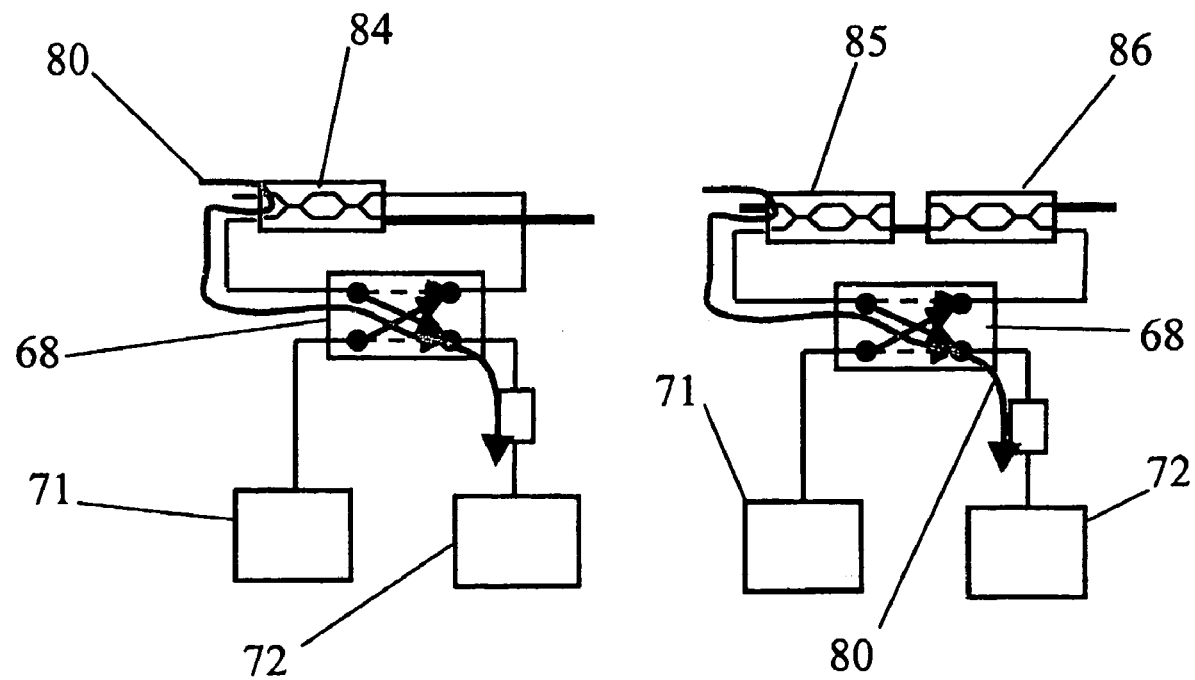
FIG. 8 illustrates two embodiments of the present invention using Mach-Zender based fibre Bragg grating filters.

The present invention uses fixed filters and a crossbar switch to realize a re-configurable network. An arrangement/NODE for adding and dropping signals from a fibre path is illustrated in FIG. 5. The arrangement includes a drop filter 64, an add filter 65 and a 2×2 crossbar switch 68. A first optic fibre 61 is connected to the input of the drop filter 64, and a second optic fibre 63 is connected to the output of the add filter 65. Between the drop and add filter there is a light transmission medium 62. The optic fibres 61, 63 are further connected to a network (not shown). The optic fibres 61, 63 define a fibre path and the filters 64, 65 drop and add signals to this fibre path. The drop filter and the add filter can even be combined into a single filter (this is illustrated in FIG. 8). Signals that are not dropped by the drop filter pass through along the fibre path. The drop filter 64 has a first output connected to the add filter, via the transmission medium 62, and a second output connected to the crossbar switch 68, via a transmission medium 67. The add filter 65 has a first input connected to the drop filter, via the transmission medium 62, and a second input connected to the crossbar switch 68, via a transmission medium 66. The crossbar switch 68 has its first input connected to the drop filter, its first output connected to the add filter, and a second input connected to a transmitter 71, via a transmission medium 70, and a second output connected to a receiver 72, via a transmission medium 69. The transmission mediums 69, 70, connected to the receiver and the transmitter, are preferably optic fibres. The filters 64, 65 are fixed and can e.g. be thin film filters, fibre Bragg gratings with circulators or Mach-Zender based Bragg grating filters. The switch 68 has two states, a first bar state 73 and a second cross state 74. In the first state 73 the drop filter is connected to the add filter. In the second state 74 the drop filter is connected to the receiver and the transmitter is connected to the add filter.

The drop filter drops signals on one channel; "channel A". Other channels pass the filter, with a low loss, and continue on the fibre path. When the switch is in the bar state 73, the dropped signals on channel A pass the switch through to the add filter for channel A and is added to the fibre path again. The node arrangement is now effectively transparent for all channels. This "Continue mode" is illustrated, by signal path 75, to the left in FIG. 5.

When the switch is in the cross state 74, the dropped signals pass the switch to the receiver, which thus receives the signals on channel A. In this "Add-drop mode" (to the right in FIG. 5), the transmitter can add signals to the fibre path, via the switch and the add filter. In this mode the arrangement works as a normal A/D node. Adding a signal from the transmitter is illustrated with signal path 76, dropping a signal is illustrated by signal path 77.

By using this arrangement several nodes can add and drop signals on the same channel. Signals on, for example, channel A can pass a plurality of nodes with channel A drop filters, if these nodes are set in a continue mode, until finally reaching a node (in add-drop mode) where they are dropped to a receiver. In this way a reconfigurable network can be accomplished adding extra communication capacity to nodes upon demand. For example, in a town, communication capacity can be switched between industries, companies, households, arenas and winter sport facilities during different times of a day or a year.

There is usually a high demand for crosstalk isolation for received signals in communication networks. Therefore drop filters with good crosstalk isolation to other channels are commonly used. These drop filters yield a loss to the dropped signal. If a signal on a specific channel passes several nodes set to the continue mode, so that the signal is relayed, i.e. dropped and added, several times, the losses limit the travel distance of the signal. This is disadvantageous, especially in unamplified systems. To keep down the losses for relayed signals, the solution according to the present invention uses drop filters with low drop losses and less stringent demands for crosstalk isolation. The signals can then be relayed with low losses. In this way there is a smaller need for amplifiers in networks utilising the invention. To provide good crosstalk isolation for the received signals (in the add-drop mode), the solution according to the present invention has an additional filter between the switch and the receiver.

Figure 6:
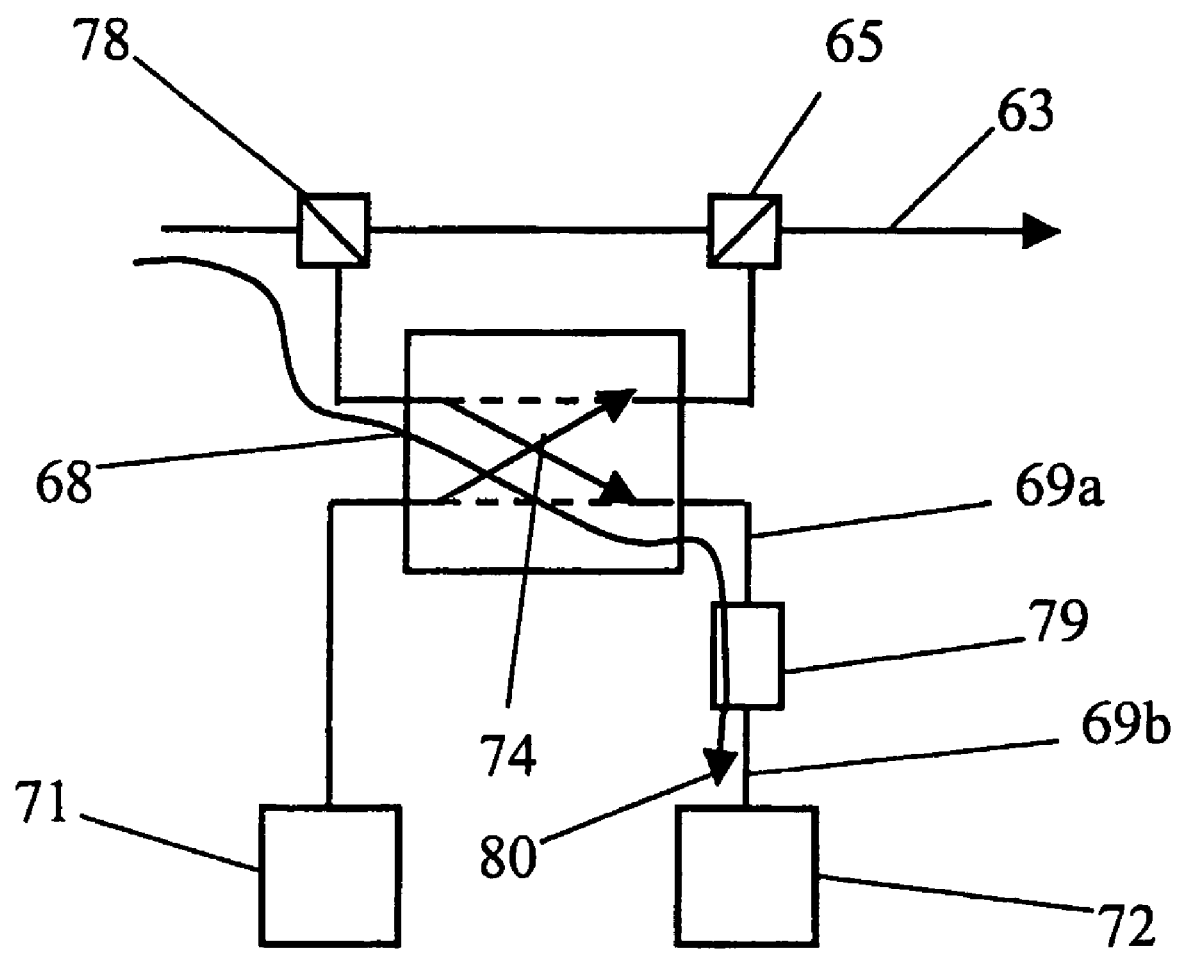
FIG. 6 illustrates the present invention having a similar configuration as the arrangement shown in FIG. 5 combined with an additional filter.

An embodiment of the invention is shown in FIG. 6. The arrangement is almost the same as the arrangement in FIG. 5. (The same reference numerals are used.) The arrangement is shown in an add-drop mode where the cross-bar switch 68 is in its cross state 74. An additional filter, a band pass filter 79, is added on the transmission medium 69 between the switch 68 and the receiver 72. The transmission medium 69 consists of two parts, for example optic fibres, 69a and 69b. The drop filter 78 is a low loss channel drop filter, with less stringent crosstalk characteristics. The band pass filter 79 is a filter with good crosstalk isolation. The drop filter 78 drops signals on one channel to the cross-bar switch 68. In the add-drop mode, the switch is in its cross state and the dropped signals pass through the switch to the band pass filter 79 and further to the receiver. In the continue mode, the switch is in its bar state and the dropped signals pass the switch to the add filter 65 and is added to the transmission path (optic fibre 63). The invention can be used in a network, with two or more nodes using the inventive arrangement for the same channel. The invention can be used in both hubbed and meshed networks. Other channels in the network can be fixed or use this invention. If a signal on this channel is relayed, in one of these nodes, it passes the first filter, the drop filter 78, but not the band pass filter 79 and thus experiences only a low loss. If a signal is directed to the receiver it passes the band pass filter 79 and thus is received with a high crosstalk isolation. By splitting the drop filter function in two parts there will be both low losses for relayed signals and good crosstalk performance for dropped signals.

In the present invention the expression relayed refers to signals passing through the crossbar switch without being dropped.

A first aspect of the present invention is a system including an add-drop node, a method using an add-drop node and an add-drop node for wavelength division multiplexing an optical signal transmission on an optical fiber network between multiple add-drop nodes. The add-drop node includes a drop filter 78, an add filter 65, a signal channel receiver 72, and a signal channel transmitter 71 each being connected to a switch 68 for signal channel relaying between the optical fiber network, and signal channel dropping and adding from and to the optical fiber network. The add-drop node provides low loss for relayed signals by allowing the drop filter 78 having low crosstalk isolation to other channels, and provides high crosstalk isolation for dropped signal channels by connecting the receiver 72 to the switch 68 through an additional filter 79 with high filtering characteristics for at least one predetermined signal channel of said optical signal transmission.

Figure 7:
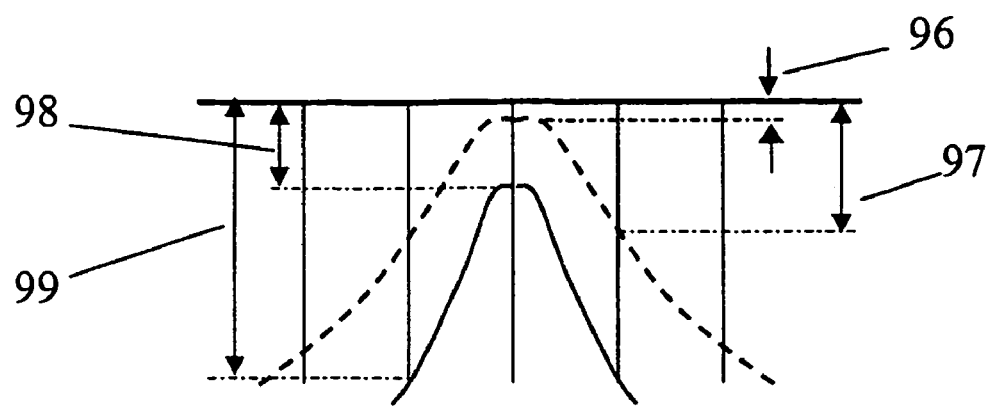
FIG. 7 illustrates filter characteristics for filters used in the present invention.

FIG. 7 shows filter characteristics for two different filters. The broken line illustrates a first filter suitable as a channel drop filter 78 in an embodiment of the present invention. The unbroken line illustrates a second filter suitable as the additional filter 79 in an embodiment of the present invention. The first filter has low insertion loss 96, but also low crosstalk isolation 97 to neighbouring channels. The second filter has high crosstalk isolation 99, but also a high insertion loss 98. If a signal passes the first filter it will have the characteristics shown by the broken line. If the signal passes the second filter it will have the characteristics illustrated by the unbroken line. The signal would have lower power and a narrower frequency width if it passed the second filter instead of the first filter.

FIG. 8 illustrates embodiments of the present invention using fibre Bragg grating based Mach-Zender filters 84, 85, 86 as add and drop filters. To the left is illustrated a combined Mach-Zender add and drop filter 84, and to the right two individual filters, a Mach-Zender drop filter 85 and a Mach-Zender add filter 86. These filters have very low losses for the dropped signal channel but have low crosstalk isolation. These filters are supplied by e. g ADC and Arroyo Optics. With such filters a loss for a signal channel in the continue mode of about 0.6 dB can be achieved (only filter losses not switch). Using thin film filters for both add and drop would give similar losses of about 2–3 dB.

Figure 9:
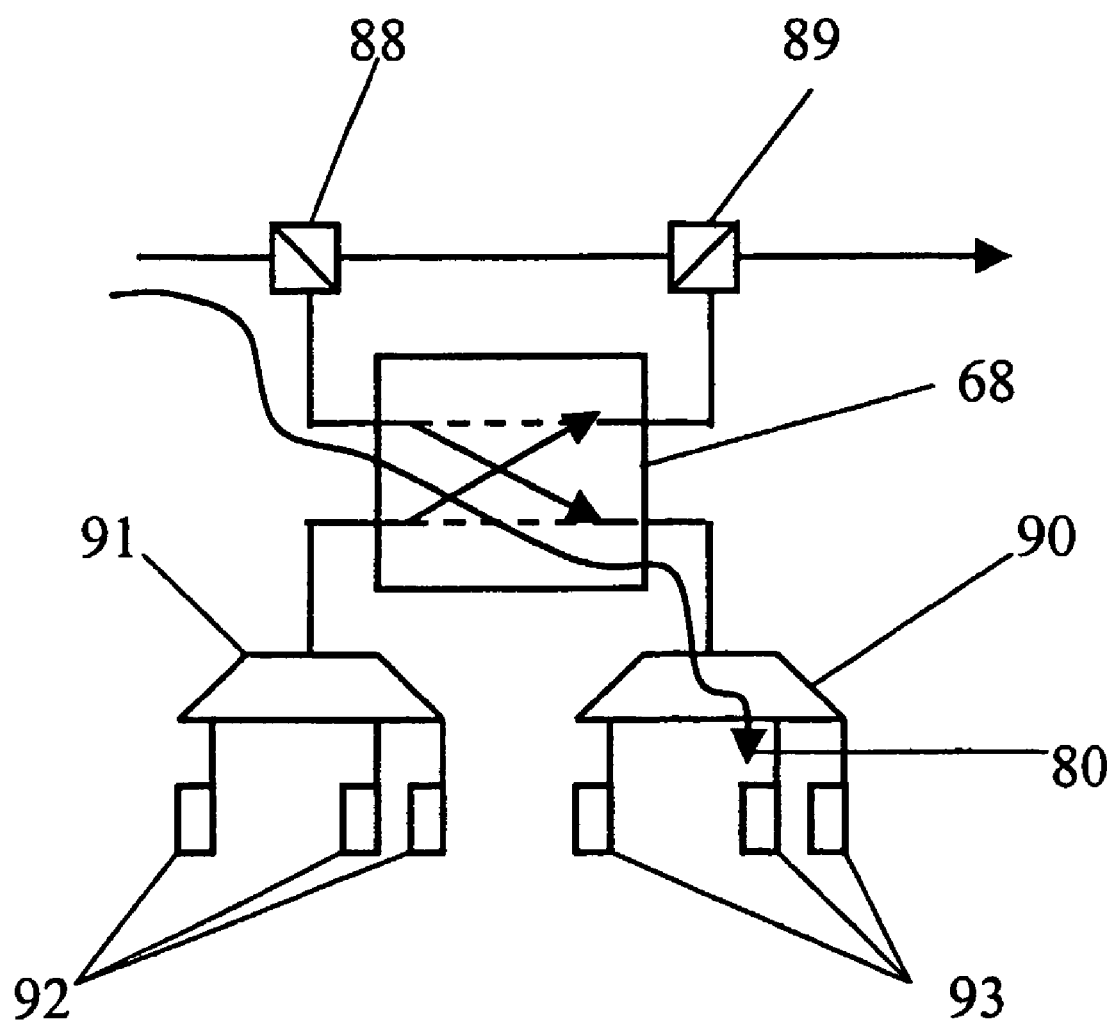
FIG. 9 illustrates an embodiment of the present invention using a fixed band filter to realize a re-configurable network.

FIG. 9 illustrates an embodiment of the present invention for a band of channels. A band drop filter 88 drops a band of signal channels through the switch 68, and the channels are separated by demultiplexer 90 and received by receivers 93. The demultiplexer can be an array of filters. Alternatively, as shown in FIG. 9 the signal channel transmitters 92 are each being multiplexed via multiplexer 91 to create a signal flow to be added via an add-filter 89 to a network through the switch 68.

Both for the add and drop filters 88, 89 in FIG. 9 and the band pass filters it is possible to use several different types of filters. Thin film filters, fibre Bragg grating based filters with circulators or fibre Bragg grating based Mach-Zender filters are the most common types. Either the same filter type can be used for all filters or they can be combined in different ways to optimise the total performance of the configurable add-drop using the same basic idea of separating the high crosstalk isolation filter from the low loss drop filter. The same is valid for both single channel and group channel drop functions.

The invention claimed is:

1. An add-drop node for wavelength division multiplexing an optical signal transmission on an optical fiber network between multiple add-drop nodes, said node comprising a drop filter (78, 84, 85, 88), an add filter (65, 84, 86, 89), a signal channel receiver (72, 93), and a signal channel transmitter (71, 92) each being connected to a switch (68) for signal channel relaying between said optical fiber network, and signal channel dropping and adding from and to said optical fiber network, characterized in providing low loss for relayed signals by allowing said drop filter having a low crosstalk isolation, and providing high crosstalk isolation for dropped signal channels by connecting said signal channel receiver to the switch through an additional filter (79, 90) with high filtering characteristics for at least one predetermined signal channel of said optical signal transmission.

2. An add-drop node according to claim 1, characterized in that the drop filter is a channel drop filter for dropping signals on a single channel.

3. An add-drop node according to claim 1, characterized in that the drop filter is a band drop filter for dropping signals on two or more channels and the additional filter forms a part of a demultiplexer.

4. A system comprising at least one add-drop node for wavelength division multiplexing an optical signal transmission on an optical fiber network between other add-drop nodes, said at least one node comprising a drop filter (78, 84, 85, 88), an add filter (65, 84, 86, 89), a signal channel receiver (72, 93), and a signal channel transmitter (71, 92) each being connected to a switch (68) for signal channel relaying between said optical fiber network, and signal channel dropping and adding from and to said network, characterized in providing low loss for relayed signals by allowing said drop filter having a low crosstalk isolation, and providing high crosstalk isolation for dropped signal by connecting said signal channel receiver to the switch through an additional filter (79, 90) with high filtering characteristics for at least one predetermined signal channel of said optical signal transmission.

5. A system according to claim 4, characterized in that the drop filter is a channel drop filter for dropping signals on a single channel.

6. A system according to claim 4, characterized in that the drop filter is a band drop filter for dropping signals on two or more channels and the additional filter form a part of a demultiplexer.

7. A method using an add-drop node for wavelength division multiplexing an optical signal transmission on an optical fiber network between multiple add-drop nodes, said add-drop node comprising a low loss drop filter (78, 84, 85, 88), an add filter (65, 84, 86, 89), a signal channel receiver (72, 93), and a signal channel transmitter (71, 92) each being connected to a switch (68) for signal channel relaying between said optical fiber network, and signal channel dropping and adding from and to said optical fiber network, characterized in that it comprises the steps of:

providing low loss for relayed signals by allowing said drop filter having a low crosstalk isolation; and providing high crosstalk isolation for dropped signal by connecting said signal channel receiver to the switch through an additional filter (79, 90) with high filtering characteristics for at least one predetermined signal channel of said optical signal transmission.

8. A method according to claim 7, characterized in that the drop filter is a channel drop filter for dropping signals on a single channel.

9. A method according to claim 7, characterized in that the drop filter is a band drop filter for dropping signals on two or more channels and the additional filter form a part of a demultiplexer.

* * * * *

UNITED STATES PATENT AND TRADEMARK OFFICE
CERTIFICATE OF CORRECTION

PATENT NO. : 7,113,662 B2
APPLICATION NO. : 10/483516
DATED : September 26, 2006
INVENTOR(S) : Ulf Persson Page 1 of 1

It is certified that error appears in the above-identified patent and that said Letters Patent is hereby corrected as shown below:

In column 5, line 16 "Coming" should be -- Corning --

Signed and Sealed this

Sixteenth Day of October, 2007

JON W. DUDAS
*Director of the United States Patent and Trademark Office*